A. H. EUSTIS.
APPARATUS FOR RECOVERING SULFUR DIOXID FROM GASES.
APPLICATION FILED JULY 16, 1919.
1,341,115. Patented May 25, 1920.
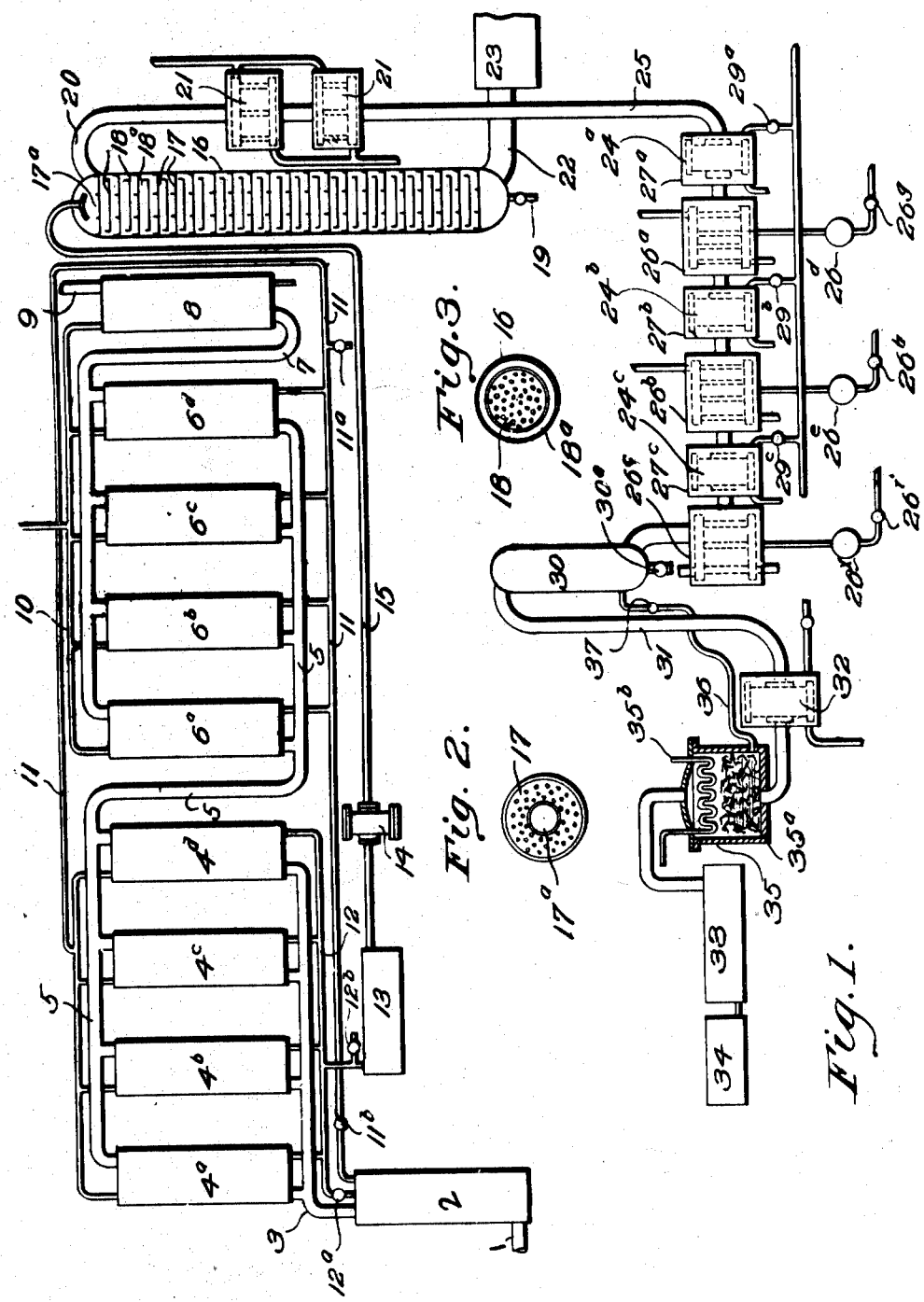
Inventor.
Augustus H. Eustis.
by Robert Roberts Cushman
Attys.

UNITED STATES PATENT OFFICE.

AUGUSTUS H. EUSTIS, OF MILTON, MASSACHUSETTS.

APPARATUS FOR RECOVERING SULFUR DIOXID FROM GASES.

1,341,115.   Specification of Letters Patent.   Patented May 25, 1920.

Original application filed April 14, 1919, Serial No. 289,857. Divided and this application filed July 16, 1919. Serial No. 311,123.

*To all whom it may concern:*

Be it known that I, AUGUSTUS H. EUSTIS, a citizen of the United States of America, and resident of Milton, in the county of Norfolk and State of Massachusetts, have invented new and useful Improvements in Apparatus for Recovering Sulfur Dioxid from Gases, of which the following is a specification.

This invention relates to apparatus for recovering sulfur dioxid from smelter smoke and other gases with which it may be associated, and consists in certain improvements upon and modifications of the apparatus shown in Letters Patent of the United States No. 1,265,892, granted to Frederic A. Eustis May 14, 1918, entitled "Method and apparatus for segregating and recovering gases." This application is a division of application Serial No. 289,857 filed by me April 14, 1919, for a method and apparatus for recovering sulfur dioxid from gases with which it may be associated.

The present invention has to do principally with improvements in those parts of the apparatus by which the sulfur dioxid is extracted from the liquor in which it has been absorbed, and by which the extracted sulfur dioxid is reduced to liquid or condensed form suitable for commercial use.

The principal objects of the invention are to safeguard and protect the pump or pumps, by which the extracted $SO_2$ gas is handled, from the destructive effects of corrosion by the gases; to utilize a part of the $SO_2$ gas (in liquid form) made by the process to remove substantially the last traces of water or moisture from the rest of the $SO_2$ gases; to make it possible to eliminate sulfuric acid desiccators heretofore used for drying the extracted gases, and to combine in the vacuum chamber the functions of a gas extractor and a condenser for the steam engine of a power plant, thus utilizing the heat of the exhaust steam for accomplishing the extraction, eliminating the heat exchanger or making it possible to use only a small heat exchanger, and saving the heat of the exhaust steam which would otherwise be wasted.

In the accompanying drawings which illustrate in diagrammatic form apparatus embodying the invention, Figure 1 is a diagram of the apparatus as a whole, and Figs. 2 and 3 are plans of shelves used in the vacuum extractor and its associated cooling chamber.

Gases from the furnace, smelter, or the like are led through flue 1 into the hot tower 2, the principal function of which is to cool, clean and enrich the gases. From tower 2 the gases pass through pipe or flue 3 into scrubbing towers $4^a$, $4^b$, $4^c$, $4^d$, in parallel; thence by pipe or flue 5 into scrubbing towers $6^a$, $6^b$, $6^c$, $6^d$, in parallel; thence by pipe or flue 7 into the lime tower 8; and thence by pipe or flue 9 to a stack or the atmosphere. The hot tower 2, the scrubbing towers $4^a$, etc., (which may be termed the 4-group) the scrubbing towers $6^a$, etc., (which may be termed the 6-group), and the tower 8 may all be substantially similar, and are packed with masses of broken, solid material in such form that water or liquid descending through the towers will be broken up to present extended superficial areas for contact with the gases from the furnace. The material with which the towers are packed may be coke, slag or other insoluble material, or limestone or other soluble material which will increase the capacity of the liquid for absorbing $SO_2$, or the packing may be in part such insoluble material, and in part such soluble material. Preferably the hot tower 2, and the scrubbing towers of the 4-group and the 6-group, will be packed with coke or other insoluble material, while the tower 8 will be packed with limestone, or some similar soluble material, to increase the capacity of the liquid to absorb $SO_2$, and thus remove as nearly as possible the last trace of $SO_2$ from the gases.

Water is fed to the scrubbing towers of the 6-group and to tower 8 from any suitable source of supply through pipe 10, whence it is delivered in parallel to headers or distributers at the tops of the several towers, and from the distributers flows or trickles down through the packing. The water from tower 8 flows to waste, or if it is desired to utilize all the $SO_2$, it may be conducted to either the scrubbers of the 6-group or the 4-group. The water from the towers of the 6-group is collected in pipe 11, and may be disposed of in three ways. Part of it may be delivered through valve $11^b$ into the top of the hot tower 2, where it will become heated by the incoming hot furnace gases and give up its sulfur dioxid gas thereby enriching the furnace gases which pass to the scrubbers of the 4-group; part of the water will be carried by pipe 11 and delivered into the tops of the scrubbers of the 4-group, through the several towers of which it passes in parallel; and part will probably always be wasted to the sewer through valve 11$^a$.

It will be observed that both the liquids and the gases pass through the individual towers of each group in parallel, and through the groups in series. The water first passing through the scrubbers of the 6-group takes up sulfur dioxid gas which still remains in the furnace gases after their passage through the scrubbers of the 4-group, and is then further enriched as it passes through the scrubbers of the 4-group. The solution from the 4-group is collected in pipe 12, and part of it may be delivered through valve 12$^a$ into the hot towers 2, where the solution will become heated and give up its gas, thereby further enriching the gas which flows to the scrubbers of the 4-group. Whether the solutions from the 4-group or the 6-group, or either of them, are delivered into the hot tower, will be determined by the operative conditions of the particular plant and the analyses of the solutions as they may be found; and such delivery may be controlled by the valves 11$^b$ and 12$^a$. The conditions will vary with different supplies of gas, and probably from hour to hour with the same supply of gas. The remainder of the solution from the scrubbers of the 4-group will be delivered into a storage tank 13, or wasted through valve 12$^b$ if the supply exceeds the capacity of the subsequent parts of the apparatus to take care of it.

As thus far described the process and apparatus are the same as set forth in said former Patent No. 1,265,892.

From storage tank 13, which is covered to prevent the escape of SO$_2$ gas, the solutions flow, aided by the pump 14 if necessary, through pipe 15 to the top of a tank or chamber 16, the upper part of which constitutes a douche tank to cool the gases and the lower part of which constitutes a vacuum extractor. The tank 16 is provided with a series of shelves or pans 17 having a central opening 17$^a$ for the passage of gas, and shelves or pans 18 of less diameter than the tank 16 to leave an annular opening 18$^a$ around the periphery for the passage of gas. The shelves 17 and 18 are arranged alternately as shown, and each shelf overlaps the opening of the next shelf, thus providing a tortuous or sinuous passage for the gases rising through the tank. The shelves are also perforated with a large number of small holes through which the solutions flow broken up into drops or small streams to expose superficially extensive surfaces.

The descending solutions thus broken up and spread out are subjected in the lower part of the tank 16 to the combined effect of heat and vacuum by which the SO$_2$ gas is extracted from the liquor. The heat which, combined with the vacuum, accomplishes the extraction of the gas in the extractor (the lower part of tank 16) is supplied through the exhaust steam pipe 22 leading from the steam engine, or turbine 23, which operates the plant, or does other work, into the bottom of the extractor chamber. The vacuum is produced by the vacuum pump or pumps, hereinafter described, connected to pipe or flue 20 which leads out of the top of tank 16.

The steam entering the extractor chamber at the bottom of tank 16 heats the solution therein, thus effecting the extraction of the gas in conjunction with the vacuum, and in so doing is condensed; or if condensation in the lower part of tank 16 is not complete the exhaust steam rising through the cooling chamber in the upper part of tank 16 is therein wholly condensed.

The SO$_2$ gases extracted in the extraction chamber at the bottom of tank 16 go upward through the douche tank cooling chamber at the upper part of tank 16, passing in contact with the descending solution, broken up and spread out by the shelves 17, 18, and are thereby cooled, causing condensation of water or other liquid which may be contained in the gases, and perceptibly drying the gases. The SO$_2$ gases thus partially dried pass out from the top of the cooling chamber through pipe or flue 20. In rising through tank 16 the gases are not only cooled by the descending solution, which precipitates out considerable of the water vapor, but the solution itself is also somewhat warmed, thereby contributing to the extraction of the gases in the extractor chamber at the lower part of the tank 16.

It will be observed that the chamber 16 serves as a combined extractor for the gas and condenser for the exhaust steam, thereby utilizing the heat of the exhaust steam, now usually wasted, for assisting in recovering the gas from the liquor, and doing away with or materially reducing the size of the heat exchanger or other specially contrived source of heat for accomplishing the extraction such as that shown in said former patent.

After the gases have been extracted from the solution the liquor flows out of the bottom of the extractor through pipe 19 to waste, or to a small heat exchanger of the character shown in said Patent No. 1,265,892, if any is used.

A small amount of the gas is probably reabsorbed in the liquor as it rises through the upper part of tank 16, but as it is at all times subject to a vacuum, and as the time during which it is in contact with the liquor in the cooling chamber of tank 16 is short, the amount so reabsorbed is small, and what little is so reabsorbed again passes into the extractor chamber and is therefore recovered without loss.

From the top of the cooler or douche tank the gases go by pipe 20 to refrigerators or surface coolers 21 where they are further cooled by brine or other suitable agencies, or are refrigerated by an ammonia system or the like, and a still further part of the contained water vapor is given up. Any suitable means for cooling and thus drying the gas may be used at this stage.

From the coolers 21 the gases flow by pipe 25 to vacuum pump $24^a$ which maintains the vacuum in the extractor chamber and cooling chamber of tank 16, and in refrigerators 21. With the present invention it is possible to dispense with all sulfuric acid desiccators shown in said former patent, and to use coolers, and liquid sulfur dioxid as hereinafter described, as the desiccating means.

The gases passing through the vacuum pump $24^a$ still contain some water vapor or moisture in condensed or condensing state. Wet acid gases, that is, gases carrying liquid acids or free water or water vapor, attack and rapidly corrode the pump. I find, however, that if the gases which come in contact with the pump are dry, that is, are free of liquid acids, water or other liquid, they are practically harmless. Conceivably the gases could be rendered substantially dry and harmless by raising the temperature of the entire body of the gas above the dew point before it enters the pump, but this is costly and unnecessary provided the gas actually contacting with the walls and surfaces of the pump and its parts is raised above the dew point and thus rendered dry and nondestructive. To accomplish this I provide the pump $24^a$ with a steam jacket $27^a$ supplied with hot steam through pipe 28 from any suitable source adapted to raise the temperature of the pump $24^a$ to such point that the heat of the pump will raise the temperature of the gases in actual contact therewith above the dew point, thus depriving the gases in contact with the pump of free water, condensed or condensing vapor or other moisture. It is not necessary that the part of the gases passing through the pump but not actually bathing or contacting with its surface should be so dried, nor that heat should be expended to that end. The heat supplied to the steam jacket $27^a$ can be regulated and controlled by a valve $29^a$ or in any convenient manner.

When the apparatus is first started up the temperature of the pump is raised to the desired point by admitting steam to the steam jacket. After operation for a while a part of the heat and in some instances the whole of the heat required will be supplied by the heat of compression of the pump itself. Indeed, it may develop with some apparatus that the pump will become too hot from the heat of compression, and in that event the steam in the jacket $27^a$ may be replaced by water circulation to reduce the heat. In short, the purpose of the jacket $27^a$ is to control the heat of the pump, whether by raising or lowering the temperature, the essential condition being that the temperature of the pump be maintained at such point that the gases in immediate contact with its surfaces, that is, at least a film or layer of the gases actually contacting with the surfaces of the pump, be raised by the heat of the pump above the dew point with respect to the liquids contained in the gases.

From vacuum pump $24^a$ the gases, compressed by the pump, are delivered into a cooler $26^a$, which may be a surface cooler similar to 21, and therein cooled. The cooling of the gases in $26^a$ condenses out part of the remaining water or other liquid. Thence the gases are drawn by pump $24^b$, further compressed thereby, and delivered to another cooler $26^b$, similar to $26^a$, and therein further cooled and dried. The pump $24^b$ may be kept at the desired temperature by a jacket $27^b$, supplied with steam or other temperature controlling fluid through valve $29^b$ in the inlet pipe, in the same manner and for the same purpose as already described in connection with pump $24^a$. From cooler $26^b$ the gases are drawn by pump $24^c$, similarly inclosed in a jacket $27^c$ controlled by valve $29^c$, further compressed thereby, and delivered into another cooler $26^c$ similar to coolers $26^a$ and $26^b$, and therein further cooled and dried. From cooler $26^c$ the gases pass to cooling chamber 30, which still further cools the gases and condenses out most of the remaining water or other liquid, and the latter is removed through pipe $30^a$.

In order that the coolers $26^a$, $26^b$, $26^c$ and 30 may not be vulnerable to attack by the corrosive acids, they are made of lead or other acid-resisting material. The compressors or pumps on the other hand are preferably made of iron, steel, brass, or other metal suitable for resisting the wear of the moving parts, and are therefore vulnerable to corrosion unless maintained at a temperature above the dew point of the contained gases. This apparatus therefore contains in combination one or more compressors or pumps vulnerable to corrosion but protected against the effects of moist gases by regulating the temperature of the compressors, and one or more coolers substantially invulnerable to corrosion which may be kept below the dew point so as to get the moisture out of the gases. The condensed moisture may be drawn off from the bottoms of coolers 26ª, 26ᵇ and 26ᶜ by pipes leading into traps or receptacles 26ᵈ, 26ᵉ, and 26ᶠ, which may be emptied from time to time through valves 26ᵍ, 26ʰ and 26ⁱ.
The repeated or multiple stage compressing and cooling of the gases which takes place in the series of pumps 24ª, 24ᵇ, 24ᶜ, and their successive coolers, progressively removes moisture from the gases with the important result that not only is the volume of the gas reduced, thus reducing the power required to handle the gas, but the steam resulting from the moisture in the gas is in part taken out at each stage and therefore does not have to be compressed at a succeeding stage, thus avoiding the expenditure of power which would otherwise be required to compress the steam. The drying of the gases which results from the repeated compressing and cooling also serves in a measure to protect the apparatus from the injurious effects of the corrosive acids, which are much more pronounced when the gases are wet than when they are dry. Although I have shown three pumps and coolers comprised in this multiple stage compressing and cooling system it will be understood that this is only by way of illustration, and two or any larger number as desired, might be used to produce repeated compressing and cooling of the gases from the vacuum up to the final compression desired. Moreover, so far as certain of the other aspects of the invention are concerned a single pump and cooler might be used at this point.

However, if only one unit or pump is used for maintaining a vacuum on the intake side and compressing the gases on the delivery side, the compression made by a single unit is so extensive that it creates a temperature such that it is necessary or advisable to cool the pump to protect it from overheating. If the pump has to be cooled it is difficult to control the temperature so that it will not at some place in the pump fall below the dew point of the gases and damage the pump. But by gradually compressing the gases in repeated stages by a plurality of pumps, and cooling the gases to remove the water vapor between the pumps, this difficulty is overcome because the temperature of compression at each stage is much less; and although the dew point of the gas is raised somewhat at each stage of the compression, the temperature is also raised by the compression fast enough to offset this effect, with the result that the gases remain dry.
Also as part of the water vapor is taken out in each of the several coolers the dew point of the gas is lowered by each cooler before the gas passes to the next pump, thus by each cooler lowering the necessary temperature for the next pump.
The gases thus cooled and dried pass out of the top of cooler 30 through pipe 31 to a compression pump 32, by which the gases are compressed and delivered into a condenser 33 cooled by brine or other agency, where they become liquefied as the combined result of pressure and low temperature. The liquefied gas is stored in a container 34.

Between the compressor 32 and the condenser 33 is a trap 35 containing liquid sulfur dioxid, which acts as a desiccator to absorb the last traces of moisture from the gas. This desiccator trap 35, as herein shown, is a closed vessel containing coke 35ª or other insoluble broken material to break up the liquid. It may be cooled by a water cooling coil 35ᵇ of lead pipe to such temperature as to cause a little but not all of the $SO_2$ to liquefy in the trap at the pressure therein.

A certain amount of liquid $SO_2$ produced by the process will collect in the trap 35 and absorb the last traces of moisture from the compressed gas passing therethrough from the compressor 32. Liquid $SO_2$ can hold only small amounts of water, but as the water content of the gas is now very small it will be effectively absorbed by the liquid $SO_2$ and it has been found in practice that only about .2% of water will remain in the sulfur dioxid in the condenser 33.

The liquid $SO_2$ in trap 35 with its content of absorbed water may be blown back through the pipe 36 controlled by a valve 37 into the cooler 30. It expands in cooler 30 on account of the sudden drop in pressure from trap 35 to cooler 30, thus refrigerating the cooler, and also gives up at least a part of the absorbed moisture which is condensed out in the cooler.

Thus a part of the liquid $SO_2$ produced by the process is used to get out substantially the last traces of water from the rest of the $SO_2$ gas.

The compressor 32 is preferably jacketed in the same manner as the pumps 24ª, 24ᵇ, etc., to control the temperature of the pump and keep it hot enough to raise the contacting gases above the dew point and so save the pump from corrosion. There is, however, less necessity for this than in the case of the other pumps because the gases come to the compression pump 32 drier than to the other pumps, having given up most of their remaining moisture in cooler 30.

I claim:

1. Apparatus for obtaining sulfur dioxid from material containing the same, comprising a vacuum extractor, a vacuum pump adapted to maintain a partial vacuum in the extractor, and means to heat the pump to a temperature adapted to raise the temperature of the gases in immediate contact with the pump above the dew point with respect to their contained liquids.

2. Apparatus for obtaining sulfur dioxid from material containing the same, comprising a vacuum extractor, a vacuum pump adapted to maintain a partial vacuum in the extractor and means to control the temperature of the pump whereby the latter may be maintained at a temperature adapted to raise the temperature of the gases in immediate contact with the pump above the dew point with respect to their contained liquids.

3. Apparatus for obtaining sulfur dioxid from material containing the same, comprising a vacuum extractor, a vacuum pump adapted to maintain a partial vacuum in the extractor, and a jacket surrounding the pump through which may be circulated a temperature controlling medium to maintain the temperature of the pump at a point to raise the temperature of the gases in immediate contact with the pump above the dew point with respect to their contained liquids.

4. Apparatus for obtaining sulfur dioxid from material containing the same, comprising a vacuum extractor, a vacuum pump adapted to maintain a partial vacuum in the extractor, a compression pump for compressing the extracted gases, and means to heat one or both of said pumps to a temperature adapted to raise the temperature of the gases in immediate contact therewith above the dew point with respect to their contained liquids.

5. Apparatus for obtaining sulfur dioxid from material containing the same, comprising a vacuum extractor, means for maintaining a partial vacuum in the extractor and for compressing the extracted gases, a receiver for the compressed gases, and a trap containing liquid sulfur dioxid through which the gas passes, located in the path of the gases between the vacuum producing means and the receiver, to absorb moisture from the gases.

6. Apparatus for obtaining sulfur dioxid from material containing the same, comprising a vacuum extractor, means for maintaining a partial vacuum in the extractor, a compression pump for compressing the extracted gases, a receiver to which the compression pump delivers, and a trap containing liquid sulfur dioxid through which the gas passes between the compression pump and the receiver to absorb moisture from the compressed gas.

7. Apparatus for obtaining sulfur dioxid from material containing the same, comprising a vacuum extractor, means for maintaining a partial vacuum in the extractor, a compression pump for compressing the extracted gases, a receiver to which the compression pump delivers, and means between the compression pump and the receiver adapted to liquefy and hold the body of sulfur dioxid, whereby moisture in the compressed gas passing in contact with said liquid sulfur dioxid will be absorbed thereby.

8. Apparatus for obtaining sulfur dioxid from material containing the same, comprising a vacuum extractor, means for maintaining a partial vacuum in the extractor, a cooler to which the extracted gases are delivered from the vacuum producing means, a compression pump for compressing the extracted and cooled gases received from the cooler, a trap to which the compression pump delivers containing liquid sulfur dioxid by which moisture in the compressed gas passing therethrough is absorbed, and means connecting said trap to the cooler to deliver said liquid sulfur dioxid into the cooler.

9. Apparatus for obtaining sulfur dioxid from material containing the same, comprising a vacuum extractor, a vacuum pump for maintaining a partial vacuum in the extractor, a cooler to which the vacuum pump delivers, a compression pump for compressing the extracted gases received from the cooler, a receiver to which the compression pump delivers, a trap between the compression pump and the receiver to hold liquid sulfur dioxid by which moisture in the compressed gas passing therethrough is absorbed, and means connecting the trap to the cooler to deliver said liquid sulfur dioxid into the cooler.

10. Apparatus for obtaining sulfur dioxid from liquid containing the same, comprising a chamber constituting a combined vacuum extractor and exhaust steam condenser, means for delivering liquid containing sulfur dioxid into said chamber, means for maintaining a partial vacuum in said chamber, and means for delivering the exhaust from a steam engine into said chamber, whereby the heat of the exhaust from the steam engine will in conjunction with the vacuum extract the sulfur dioxid gas from the liquid, and the liquid will in turn condense the exhaust steam.

11. Apparatus for obtaining sulfur dioxid from material containing the same, comprising a vacuum extractor, a plurality of alternately arranged pumps and coolers, arranged in series, connected to the extractor and adapted repeatedly and progressively to compress and cool the gas and so deprive it of moisture, and means to remove the condensed moisture from the several coolers.

12. Apparatus for obtaining sulfur dioxid from material containing the same, comprising a vacuum extractor, a plurality of alternately arranged pumps and coolers, arranged in series, connected to the extractor and adapted repeatedly and progressively to compress and cool the extracted gas and so deprive it of moisture, means to remove the condensed moisture from the several coolers, a receiver for the compressed gas, and a trap containing liquid sulfur dioxid through which the gas passes located in the path of the gas between the pumps and the receiver to absorb moisture from the compressed gas.

13. Apparatus for obtaining sulfur dioxid from material containing the same, comprising a vacuum extractor, a vacuum pump for maintaining a partial vacuum in the extractor and compressing the extracted gases, means to control the temperature of said pump to maintain it above the dew point of the extracted gases with respect to their contained liquids, a cooler to which said pump delivers the gases, and one or more additional pumps and coolers, arranged in series with said vacuum pump, the successive pumps and coolers being adapted repeatedly and progressively to compress and cool the gases and so deprive them of moisture.

14. Apparatus for obtaining sulfur dioxid from material containing the same, comprising a vacuum extractor, a vacuum pump for maintaining a partial vacuum in the extractor and compressing the extracted gases, means to control the temperature of said pump to maintain it above the dew point of the extracted gases with respect to their contained liquids, a cooler to which said pump delivers the gases, and one or more additional pumps and coolers, arranged in series with said vacuum pump, and means to control the temperature of such additional pump or pumps to maintain the same above the dew point of the gases with respect to their contained liquids.

15. Apparatus for obtaining sulfur dioxid from material containing the same, comprising a vacuum extractor, a vacuum pump for maintaining a partial vacuum in the extractor and compressing the extracted gases, means to control the temperature of said pump to maintain it above the dew point of the extracted gases with respect to their contained liquids, a cooler to which said pump delivers the gases, and one or more additional pumps and coolers, arranged in series with said vacuum pump, the successive pumps and coolers being adapted repeatedly and progressively to compress and cool the gases and so deprive them of moisture, a receiver for the compressed gases, and a trap containing liquid sulfur dioxid located in the path of the gas between the pumps and the receiver.

16. Apparatus for obtaining sulfur dioxid from material containing the same, comprising a vacuum extractor, a compressor and cooler connected to the extractor and adapted respectively to compress and cool the gas and so deprive it of moisture, the compressor being made of wear-resisting material subject to corrosion at temperatures below the dew point of the contained gases, and the cooler being made of material relatively invulnerable to corrosion, and means to control the temperature of the compressor adapted to keep the temperature of the gases in immediate contact with the compressor above the dew point with respect to their contained liquids.

17. Apparatus for obtaining sulfur dioxid from material containing the same, comprising a vacuum extractor, a plurality of alternately arranged compressors and coolers, arranged in series, connected to the extractor and adapted repeatedly and progressively to compress and cool the gas and so deprive it of moisture, the compressors being made of wear-resisting material subject to corrosion at temperatures below the dew point of the contained gases, and the coolers being made of material relatively invulnerable to corrosion, and means to control the temperature of the compressors adapted to keep the temperature of the gases in immediate contact with the compressors above the dew point with respect to their contained liquids.

18. Apparatus for compressing and drying sulfate dioxid gas which comprises a pump, a receiver to which the pump delivers, and a trap containing liquid sulfur dioxid through which the gas passes, located between the pump and the receiver to absorb moisture from the compressed gas.

19. Apparatus for compressing and drying sulfur dioxid gas which comprises a pump, a receiver to which the pump delivers, and means between the pump and the receiver adapted to liquefy and hold a body of the sulfur dioxid gas, whereby moisture in the compressed gas passing in contact with said liquid sulfur dioxid will be absorbed thereby.

20. Apparatus for compressing and drying sulfur dioxid gas which comprises a cooler, means to deliver the gas to the cooler, a pump for compressing the cooled gases received from the cooler, a trap to which said pump delivers containing liquid sulfur dioxid by which moisture in the compressed gas passing therethrough is absorbed, and means connecting said trap to the cooler to deliver liquid sulfur dioxid into the cooler.

21. Apparatus for compressing and drying sulfur dioxid gas which comprises a plurality of alternately arranged pumps and coolers arranged in series and adapted repeatedly and progressively to compress and cool the gas and so deprive it of moisture, and means to remove the condensed moisture from the several coolers.

22. Apparatus for compressing and drying sulfur dioxid gas which comprises a plurality of alternately arranged pumps and coolers arranged in series and adapted repeatedly and progressively to compress and cool the gas and so deprive it of moisture, means to control the temperature of said pumps to maintain the same above the dew point of the gases with respect to their contained liquids, and means to remove the condensed moisture from the several coolers.

23. Apparatus for compressing and drying sulfur dioxid gas which comprises a plurality of alternately arranged pumps and coolers arranged in series and adapted repeatedly and progressively to compress and cool the gas and so deprive it of moisture, means to remove the condensed moisture from the several coolers, a receiver for the compressed gas, and a trap containing liquid sulfur dioxid through which the gas passes located in the path of the gas between the pumps and the receiver to absorb moisture from the compressed gas.

24. Apparatus for compressing and drying sulfur dioxid gas which comprises a compressor or compressors and a cooler or coolers, adapted respectively to compress and cool the gas and so deprive it of moisture, the compressor or compressors being made of wear-resisting material subject to corrosion at temperatures below the dew point of the contained gas, and the cooler or coolers being made of material relatively invulnerable to corrosion, and means to control the temperature of the compressor or compressors adapted to keep the temperature of the gas in immediate contact therewith above the dew point with respect to its contained liquids.

Signed by me at Boston, Massachusetts, this tenth day of July, 1919.

AUGUSTUS H. EUSTIS.